United States Patent
Hickman et al.

(10) Patent No.: US 6,279,802 B1
(45) Date of Patent: *Aug. 28, 2001

(54) VEHICLE ARTICLE CARRIER HAVING WIND NOISE REDUCING CROSS BAR

(75) Inventors: K. Michael Hickman, Rancho Palos Verdes, CA (US); Antonio Teodoro, LaSalle (CA)

(73) Assignee: JAC Products, Inc., Ann Arbor, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/275,830
(22) Filed: Mar. 25, 1999
(51) Int. Cl.[7] .................................................... B60R 9/045
(52) U.S. Cl. ......................... 224/321; 224/316; 224/326
(58) Field of Search .................................. 224/321, 316, 224/326, 309

(56) References Cited

U.S. PATENT DOCUMENTS

| | | |
|---|---|---|
| 5,071,050 | 12/1991 | Pudney et al. . |
| 5,474,217 * | 12/1995 | Mandarino et al. ................. 224/321 |
| 5,474,218 * | 12/1995 | Arsenault, Jr. et al. ............. 224/316 |

\* cited by examiner

Primary Examiner—Gary E. Elkins
(74) Attorney, Agent, or Firm—Harness, Dickey & Pierce, PLC

(57) ABSTRACT

A vehicle article carrier which enables a degree of adjustable spacing of the support members used to support a cross bar while preventing the generation of wind noise which might be otherwise caused by wind entering through openings in the support members while the vehicle is moving. The vehicle article carrier includes front and rear cross bar assemblies which are mounted on a pair of slats. The slats may be disposed such that they converge slightly. At least one bracket member of one of the cross bar assemblies includes an elongated slot formed therein and a neck portion of the support member. The neck portion receives one end of one of the cross bars and enables the cross bar to move inwardly or outwardly of the neck as needed, such as when the cross bar is repositioned on a pair of slats which are mounted on a vehicle such that they converge slightly. Within the neck portion of the support member is disposed a compressible, foam-like rubber member which automatically covers that portion of the slot formed in the neck portion which is not covered by the end of the cross bar. In this manner no wind can enter through the slot and potentially create wind noise. The foam-like member also allows for a degree of adjustability in the spacing of the support members at each end of the cross bar such that the cross bar can be used on different model vehicles which would ordinarily require different lengths of cross bars. The foam-like member does not significantly complicate assembly or manufacture of the vehicle article carrier or otherwise add significantly to its complexity of construction, its cost or its weight.

32 Claims, 2 Drawing Sheets

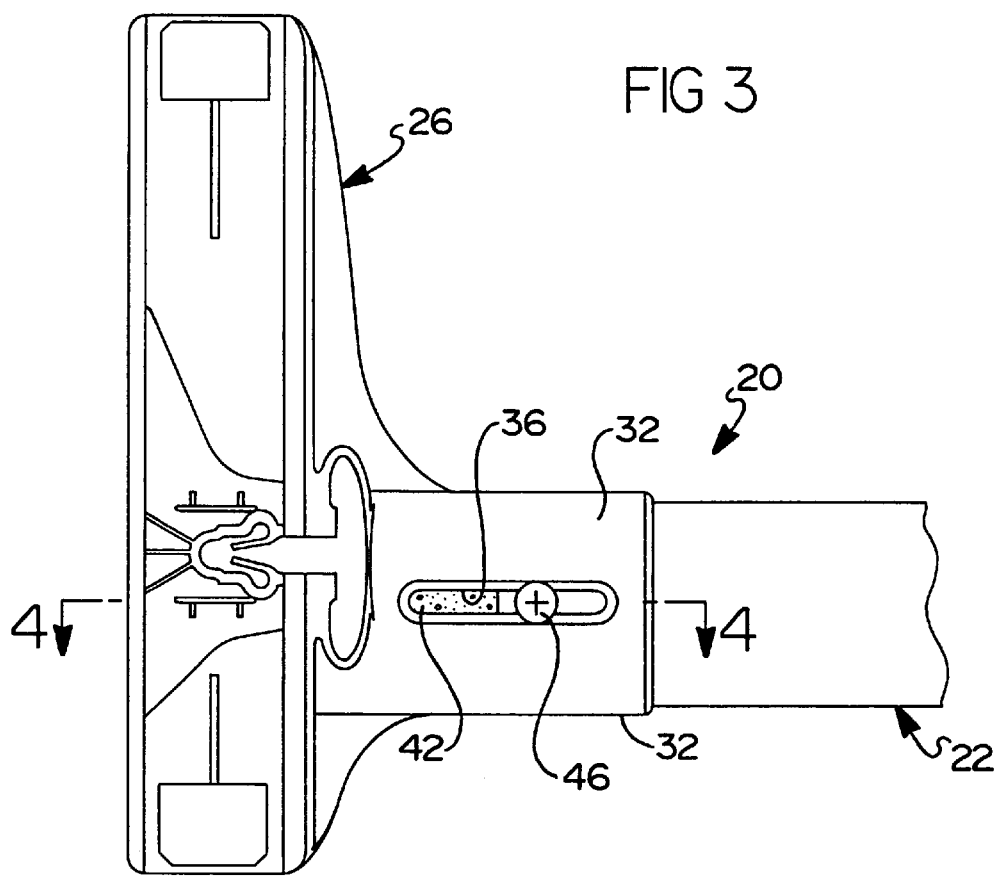
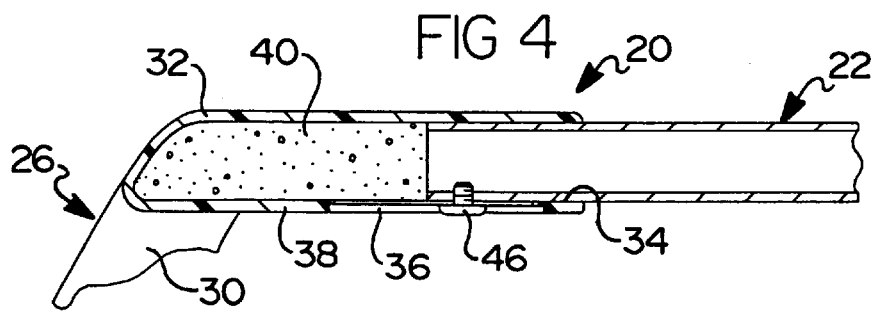
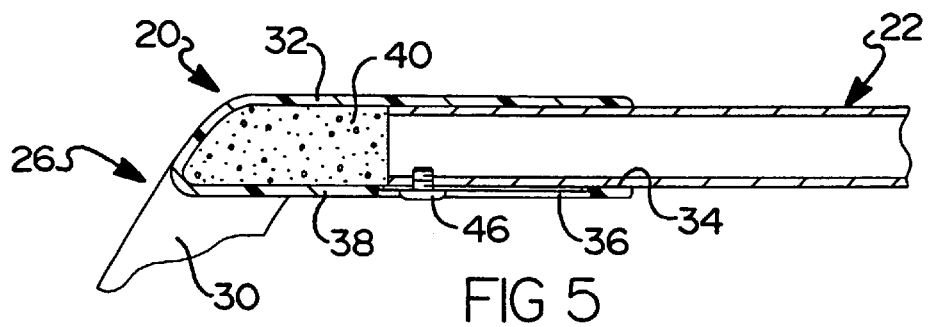

VEHICLE ARTICLE CARRIER HAVING WIND NOISE REDUCING CROSS BAR

BACKGROUND OF THE INVENTION

1. Technical Field

This invention relates to vehicle article carriers, and more particularly to a vehicle article carrier incorporating a cross bar constructed to reduce or eliminate wind noise generated thereby.

2. Discussion

Vehicle article carriers are used in a wide variety of applications to enable various articles to be secured above an outer surface of a vehicle and transported thereon. Such vehicle article carriers typically incorporate a pair of slats which are fixedly secured to an outer body surface, such as a roof or deck lid of the vehicle. The slats are typically secured such that they extend generally parallel to one another. One or more cross bars are incorporated which each include a support member at opposite ends thereof for securing the cross bar to the slats. Often, one of the cross bars is fixedly secured to the slat so as to be immovable while the other cross bar may be adjustably positioned along the slats as needed to accommodate variously sized articles being supported on the cross bars.

With some modern day vehicles, the vehicle roof has a shape which requires the slats to converge slightly in order to follow the contour of the vehicle roof. The convergence of the slats requires that the movable cross bar be adjustably secured to at least one of its associated support members such that the overall length of the cross bar can be effectively increased or decreased slightly as the cross bar moves along the slats. This has typically been accomplished by a slot which is formed in one of the supports associated with the movable cross bar. The slot enables a fastening member to secure one end of the cross bar to the support and further enables the cross bar to move slightly inwardly and outwardly relative to the support to accommodate the convergence of the slats when the cross bar is moved along the slats.

The above described arrangement in which a slot is formed within a portion of the support member has been found to, in some instances, generate some objectionable wind noise. In some instances, the slot may have a "flute" like effect depending upon the speed of the vehicle and various environmental conditions such as the speed and direction of wind which the vehicle is subjected to.

Accordingly, it would be highly desirable to provide some means for coupling an end of a movable cross bar to its associated support member to provide for a degree of adjustability between these two components while doing so in a fashion which prevents any wind noise from being generated by the support member at the area where it couples to its associated cross bar.

SUMMARY OF THE INVENTION

The present invention relates to a vehicle article carrier which enables a degree of adjustability in the overall length of a movable cross bar thereof while reducing or eliminating the wind noise which might be generated because of the adjustable coupling of a support member to a movable cross bar of the article carrier. In the preferred embodiment the present invention incorporates a pair of slats which are adapted to be fixedly secured to an outer body surface of a vehicle such as the vehicle roof or even a deck lid of the vehicle. At least one movable cross bar is included having its outermost ends coupled to a pair of support members. The support members are adapted to be coupled to the slats such that the support members can be moved slidably along the slats and positioned at a desired point along the slats.

The adjustable positioning feature is accomplished by a slot which is formed in a neck portion of one of the support members. The neck portion is adapted to receive one end of one of the cross bars and the end of the cross bar is secured to the neck portion by a fastening element. The fastening element permits the end of the cross bar to move slightly inwardly or outwardly of the neck portion such that the overall length of the cross bar can be either lengthened or shortened slightly as needed.

Within the neck portion is disposed a compressible, foam-like member. The foam-like member effectively covers that portion of the slot which is not covered by the end of the cross bar when the end of the cross bar is inserted into the neck portion. Since the foam-like member is compressible, it allows the end of the cross bar to be urged inwardly relative to the neck portion when needed, such as when the cross bar is being moved along two slightly converging slats. Conversely, the compressible nature of the foam-like member allows it to take up the space vacated within the neck portion of the support member by the end of the cross bar if the cross bar is moved along the slats in a direction such that the slats diverge slightly. Thus, the foam-like member compresses or expands as needed to fill the unoccupied area within the neck portion of the support member such that air cannot enter through the uncovered portion of the slot in the neck portion and thereby create wind noise while the vehicle is moving.

In the preferred embodiment the foam-like member is comprised of low density, closed cell foam rubber. The use of the foam-like member does not significantly complicate the assembly of the vehicle article carrier, add significantly to its cost or weight, or require any other modifications to the support members.

BRIEF DESCRIPTION OF THE DRAWINGS

The various advantages of the present invention will become apparent to one skilled in the art by reading the following specification and subjoined claims and by referencing the following drawings in which:

FIG. 3 is a bottom view of the cross bar assembled to the support member;

FIG. 4 is a partial cross sectional view of the support member of FIG. 3 taken in accordance with section line 4—4 in FIG. 3;

FIG. 5 is a view of the support member and cross bar shown in FIG. 4 with the cross bar inserted farther into the neck portion of the support member, illustrating how the foam-like member compresses to permit further inward travel of the end of the cross bar into the neck portion.

DETAILED DESCRIPTION OF THE PREFERRED EMBODIMENTS

Figure 1:
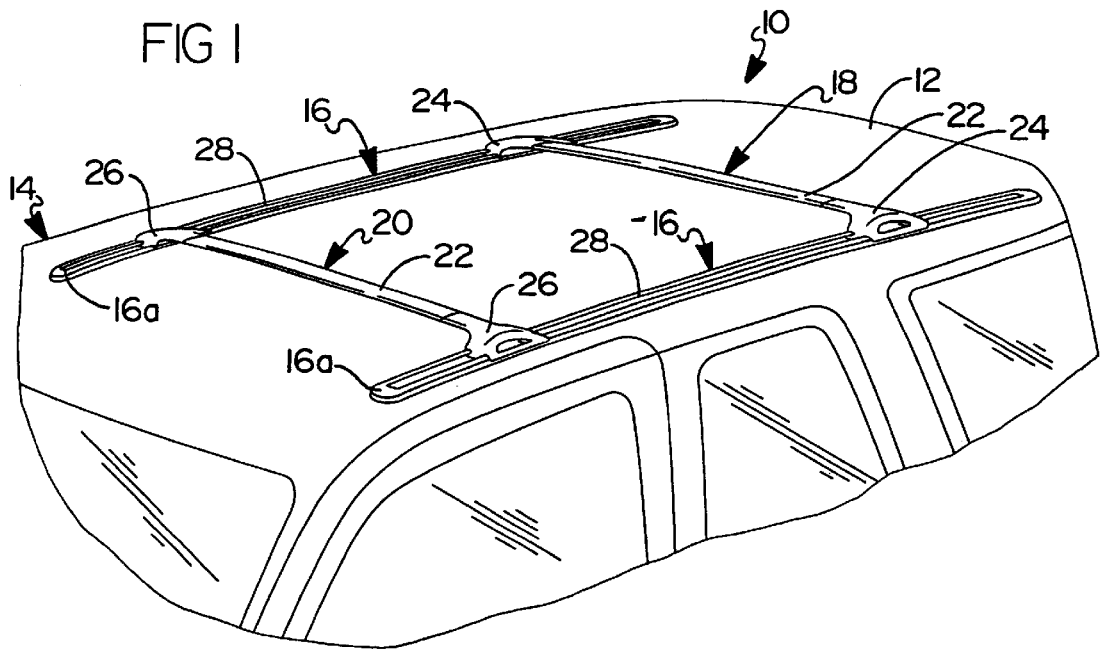
FIG. 1 is a perspective view of a vehicle article carrier in accordance with the present invention illustrating same secured to an outer body surface of a vehicle.

Referring to FIG. 1, there is shown a vehicle article carrier 10 in accordance with a preferred embodiment of the present invention. The vehicle article carrier 10 is shown secured to an outer body surface 12 of a vehicle 14 and generally comprises a pair of slats 16, and a pair of cross bar assemblies 18 and 20 which are secured to the slats 16. In this example the slats 16 are secured to the outer body surface 12 such that front edge portions 16a thereof converge slightly due to the shape and contour of the outer body surface 12. The cross bar assembly 20 is also movably secured to the slat 16 such that it can be positioned at various points along the slats 16 as needed to support the variously sized articles thereon. In this example the rear cross bar assembly 18 is fixedly secured to the slat 16 so as to be immovable. However, it will be appreciated that the rear cross bar assembly 18 could just as easily be adjustably positionable along the slats 16 if needed.

With further reference to FIG. 1, each cross bar assembly 18 and 20 includes a cross bar member 22. The cross bar member 22 of the rear cross bar assembly 18 is supported by support members 24 on the slat 16. The front cross bar 20 is similarly supported by support members 26. Each of the slats 16 further includes a longitudinally extending channel 28. The front support members 26 are secured to the slats 16 such that they may be moved slidably along the slats 16 so that the front cross bar 22 can be repositioned if needed.

As will be appreciated, if the front cross bar assembly 20 is moved to the frontmost ends 16a of the slats 16, due to the converging orientation of the slats 16 the support members 26 will move slightly closer towards each other. As such, at least one of the front support members 26 will need to be coupled to its associated end of the cross bar 22 to allow that end of the cross bar to move slightly relative to the support member 26.

Figure 2:
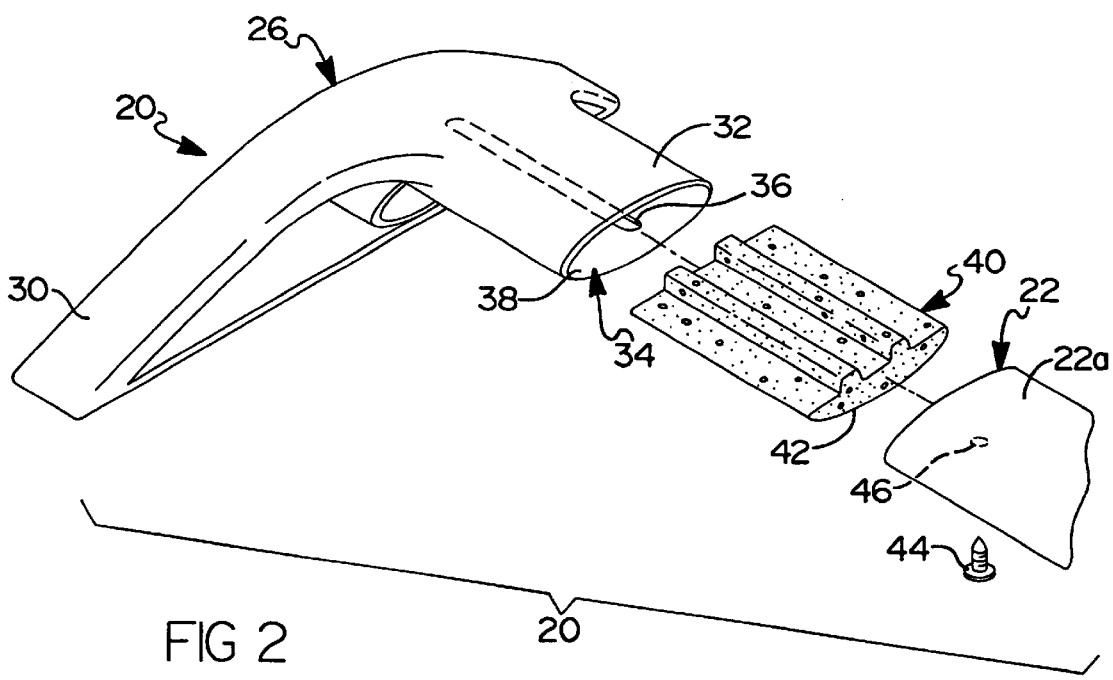
FIG. 2 is an exploded perspective view of the support member, the foam-like member housed within the support member, and a portion of the cross bar.

Referring now to FIG. 2, one of the front support members 26 is illustrated in greater detail. The front support member 26 includes a base portion 30 and a neck portion 32. The neck portion 32 includes a recessed area 34 including a slot 36 formed in a bottom wall portion 38 thereof. Within the recess 34 is disposed a compressible, foam-like member 40. The member 40 is comprised of low density, closed cell foam rubber and is readily compressible. If it is in a compressed orientation, and the compressive force is removed, the foam-like member 40 automatically expands to its original configuration. The foam-like member 40 is further shaped such that a bottom surface 42 thereof covers the slot 36 when the foam-like member 40 is inserted into the recess 34.

Referring now to FIGS. 2 and 3, an end 22a of the cross bar 22 is assembled to the support member 26 by inserting the end 22a into the recess 34. A fastening element 44 extends through the slot 36 and into an opening 46 in the cross bar 22. The fastening element allows the cross bar 22 to move inwardly or outwardly of the neck portion 32 as needed to accommodate the convergence of the slats 16.

As can be seen in FIG. 3, the foam-like member 40 is trapped within the recess 34 and covers that portion of the slot 36 which is not covered by outermost end portion 22a of the cross bar 22. Accordingly, when the vehicle is moving no air can enter through the slot 36 to potentially generate wind noise. The orientation of the foam-like member 42 is also shown in FIG. 4.

Referring to FIG. 5, as the cross bar 22 is moved towards the front most ends 16a of the slat 16 (FIG. 1), the end 22a of the cross bar will be urged further inwardly into the neck portion 32, thus compressing the foam-like member 40. The portion of the slot 36 which is not covered by the end portion 22a of the cross bar 22 is still covered by the foam-like member 40. If the cross bar 22 is moved away from the frontmost ends 16a of the slat 16 (FIG. 1), the foam-like member 40 automatically expands back into the orientation shown in FIG. 4. Thus, the foam-like member 40 automatically functions to continuously cover the slot 36 to insure that no wind enters through the slot 36 while the vehicle is traveling. The foam-like member 40 is preferably formed as a single piece component, but it will be appreciated that it could just as easily be comprised of two or more component parts which cooperatively fit within the recess 34. Advantageously, the foam-like member 40 also functions to help reduce or eliminate any vibration that might occur between the cross bar 22 and the neck portion 32 in view of the adjustable coupling of these components.

Although the foam-like member 40 is shown in a semi-circular form in FIG. 2, it will also be appreciated that the precise shape of the member is not critical to performing its intended function. The important consideration is that the open part of the slot 36 be covered at all times to prevent any wind from passing through the slot 36. The present invention accomplishes the objective of enabling adjustable positioning of a cross bar relative to its support member, while at all times blocking off the opening in the support member needed to allow for adjustable positioning of the cross bar. The present invention does not add significantly to the overall cost of the vehicle article carrier 10, does not complicate its construction or add tangibly to its overall weight or necessitate modifications in the steps of attaching the vehicle article carrier to a vehicle.

Also importantly, the present invention enables the vehicle article carrier to be used even on vehicles which do not require slightly converging slats, but where the spacing of the slats will be different because of the particular model of vehicle that the vehicle article carrier is being disposed on. In such instances, the foam-like member 42 enables a degree of adjustability in the spacing of the support members 26 and 24 while still preventing any portion of the slot 36 of each support member from being left uncovered.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier for supporting articles above an outer body surface of a vehicle, said vehicle article carrier comprising:

a pair of slats adapted to be secured to said outer body surface;

a cross bar assembly including:

a cross bar having a length sufficient to substantially span the distance between said slats;

a pair of support members secured at opposite ends of said cross bar and adapted to be secured to said slats such that said cross bar is supported above said outer body surface;

at least one of said support members including a neck portion having a recess adapted to receive one of said ends of said cross bar therein; and a compressible, foam-like member disposed in said recess of said neck portion for at least substantially filling the area within said recess not occupied by said one end of said cross bar while permitting a degree of adjustability of an overall length of said cross bar to thereby enable said cross bar to be adjusted along said slats which are disposed on said outer surface slightly non-parallel to one another.

2. The vehicle article carrier of claim 1, wherein said neck portion comprises a slot formed therein for receiving a fastening element, and wherein said foam-like member covers said slot when said one end of said cross bar is inserted within said recess and secured to said one support member.

3. The vehicle article carrier of claim 1, wherein said foam-like member is comprised of a low density, closed cell foam rubber.

4. A vehicle article carrier for supporting articles elevationally above an outer body surface of said vehicle, said vehicle article carrier comprising:
   a pair of slats adapted to be secured to said outer body surface in slightly non-parallel fashion to one another;
   a pair of support members adapted to be secured to said slats, one of said support members being secured to an associated one of said slats;
   a cross bar secured at its outermost ends to said support members;
   at least one of said support members including a neck portion having a recess for receiving an end portion of one end of said cross bar, said recess including a slot for enabling said one support member to be adjustably secured to said one end of said cross bar to thereby enable an effective length of said cross bar to be slightly lengthened or shortened;
   a fastening member associated with said cross bar and extending through said slot for securing said cross bar adjustably to said one support member; and
   a compressible, foam-like member disposed in said recess for filling that portion of said recess not occupied by said one end of said cross bar and for covering that portion of said slot which is not covered by said one end of said cross bar residing within said recess, to thereby prevent the generation of wind noise by air entering said slot.

5. The vehicle article carrier of claim 4, wherein said foam-like member is comprised of a closed cell foam rubber.

6. A cross bar assembly for use with a vehicle article carrier having a pair of slats which are adapted to be secured to an outer body surface of a vehicle, said cross bar assembly comprising:
   a pair of support members, and a cross bar adapted to be secured to said support members at its opposite ends of said cross bar for supporting articles elevationally above said outer body surface of said vehicle, at least one of said support members comprising:
      a base portion adapted to be secured to an associated one of said slats;
      a neck portion having a recess for receiving one end of said cross bar; and
      a compressible, foam-like member disposed within said recess for occupying the interior area of said recess not occupied by said one end of said cross bar.

7. The vehicle article carrier of claim 6, wherein said neck portion comprises a slot adapted to receive a fastening element, said slot enabling a degree of adjustability of an overall length of said cross bar; and
   wherein said foam-like member covers that portion of said slot which is not covered by said one end of said cross bar when said cross bar is secured to said one support member, to thereby prevent wind from entering through said slot and generating wind noise.

8. The vehicle article carrier of claim 6, wherein said foam-like member is comprised of a closed cell foam rubber.

9. A vehicle article carrier adapted to be secured to an outer body surface of a vehicle to support articles elevationally above said outer body surface, said vehicle article carrier comprising:
   a pair of slats adapted to be secured to said outer body surface substantially parallel to one another and such that said slats extend along a major longitudinal length of said outer body surface;
   a cross bar having a length sufficient to substantially span between said slats;
   a pair of support members adapted to be secured to said slats and to opposite ends of said cross bar for supporting said cross bar above said outer body surface;
   at least one of said support members including a base portion and a neck portion, said neck portion having a recess and a slot formed therein for receiving a fastening element to secure one end of said cross bar to said neck portion; and
   a compressible, foam-like member disposed within said recess for covering that portion of said slot which is not covered by said one end of said cross bar when said one end is inserted into said recess, and for enabling a degree of adjustment of an effective length of said cross bar.

10. A vehicle article carrier for supporting articles above an outer body surface of a vehicle, said vehicle article carrier comprising:
    a pair of slats adapted to be secured to said outer body surface;
    a cross bar assembly including:
       a pair of support members secured at opposite ends of a cross bar and adapted to be secured to said slats such that said cross bar is supported above said outer body surface by said support members;
       at least one of said support members and one end of said cross bar including a recess and the other including being adapted to be slid into said recess; and
       a compressible member disposed between said one of said support members and said one end of said cross bar for enabling an overall length of said cross bar to be varied to accommodate non-parallel positioning of said slats.

11. The vehicle article carrier of claim 10, wherein said compressible member comprises a foam-like member.

12. The vehicle article carrier of claim 10, wherein said one of said support members includes a neck portion including said recess; and
    wherein said compressible member is inserted into said recess;
    wherein said one of said support members includes an end portion adapted to be inserted into said recess; and
    wherein said compressible member is inserted into said recess prior to insertion of said end portion of said one support member into said recess.

13. A method for enabling a cross bar of a vehicle article carrier to be moved slidably along a pair of non-parallel slats secured to an outer body surface of a vehicle, the method comprising the steps of:
    using a pair of end supports adapted to be movably secured to said non-parallel slats to support a cross bar therebetween above said outer body surface; and
    disposing a compressible member between at least one of said end supports and one end of said cross bar to thereby allow an effective overall length of said cross bar to be varied as said end supports are moved along said non-parallel slats.

14. The method of claim 13, further comprising the step of:
forming a recess in a portion of said one of said end supports; and
disposing said compressible member in said recess.

15. The method of claim 13, further comprising forming said compressible member as a foam-like member.

16. The method of claim 14, further comprising the step of forming said compressible member in a shape which substantially conforms to a shape of said recess.

17. The method of claim 14, further comprising the step of forming said compressible member with dimensions that substantially fill said recess.

18. A method for enabling a cross bar of a vehicle article carrier to be moved slidably along a pair of non-parallel supports secured to an outer body surface of a vehicle, the method comprising the steps of:
using a pair of end supports adapted to be movably slidably along said non-parallel supports to support a cross bar therebetween above said outer body surface; and
disposing a compressible member between at least one of said end supports and one end of said cross bar in a manner which does not interfere with coupling of said one of said end supports to said one end of said cross bar, to thereby allow linear movement between said one end of said cross bar and said one of said end supports as said end supports are moved slidably along said non-parallel supports.

19. The method of claim 18, wherein said step of disposing a compressible member between at least one of said end supports and one end of said cross bar comprises the step of disposing a foam-like member therebetween.

20. A vehicle article carrier for supporting articles above an outer body surface of a vehicle, and being adapted to accommodate non-parallel placement of a pair of support rails, each having an elongated channel, fixedly on said outer body surface, said vehicle article carrier comprising:
a cross bar having opposite ends and adapted to extend transversely between said support rails so as to be supported by said support rails;
a pair of supports adapted to be secured to said channels of said support rails, each of said supports having a neck portion telescopically engaged with a respective end of said cross bar, and each of said supports being moveable along said channels of said support rails when said supports are not in locked positions relative to said support rails; and
a biasing element operably associated with said neck portion of each said support for exerting a biasing force against its respective said end of said cross bar to maintain said cross bar firmly secured between said supports and to compensate for non-parallel positioning of said support rails as said supports are moved along said support rails.

21. The article carrier of claim 20, wherein said biasing element comprises a foam-like member.

22. The article carrier of claim 20, wherein each said biasing element is disposed within a respective one of said neck portions of said support, and wherein a respective one of said end portions of said cross bar is also disposed within one of said neck portions such that one of said biasing elements is captured within its respective said neck portion.

23. The article carrier of claim 20, wherein each said neck portion comprises a slot and a fastener for securing said supports to said ends of said cross bar in a manner to permit movement of said ends of said cross bar relative to each said support.

24. A vehicle article carrier for supporting articles above an outer body surface of a vehicle, and being adapted to accommodate non-parallel placement of a pair of support rails, each having an elongated channel, fixedly on said outer body surface, said vehicle article carrier comprising:
a cross bar having opposite ends and disposed transversely between said support rails and supported by said support rails above said outer body surface;
a pair of supports adapted to be supported from said channels of said support rails, each of said supports being engaged with a respective end of said cross bar to thereby support said cross bar above said outer body surface;
and each of said supports being moveable along said support rails to permit adjustable positioning thereof at a plurality of longitudinal positions along said support rails; and
a compressible member operably associated with one of said supports and one of said ends of said cross bar for permitting movement of said supports towards and away from each other as said cross bar is moved longitudinally along said supports when said supports are not disposed parallel to one another on said outer body surface.

25. A vehicle article carrier for supporting articles above an outer body surface of a vehicle, and being adapted to accommodate non-parallel placement of a pair of support rails on said outer body surface such that a cross bar extending between and supported by said support rails may still be moved longitudinally, without binding, along said non-parallel positioned support rails, said vehicle article carrier comprising:
a biasing member effectively disposed in between one end of said cross bar and one of said support rails for permitting a degree of movement of said one support rail towards and away from said one end of said cross bar when said cross bar is moved along said support rails and said support rails are disposed non-parallel to one another, to thereby prevent binding of said cross bar during movement thereof.

26. A vehicle article carrier for supporting articles above an outer body surface of a vehicle, said vehicle article carrier comprising:
a pair of rails adapted to be fixedly supported on said outer body surface;
each one of said rails having a support operable to move linearly therealong;
a cross bar having opposite ends and adapted to extend transversely between said supports so as to be supported by said supports;
at least one of said opposite ends having a first interengaging support structure;
at least one of said supports having a second interengaging support structure;
said first and second interengaging support structures being operable to interengage such that said one opposite end is supported from said one support; and
a biasing element interposed between said first and second interengaging support structures for exerting a biasing force that tends to urge said first and second support structures away from each other when said first and second support structures are in interengaging relationship with each other.

27. The article carrier of claim 26, wherein:

said first interengaging support structure comprises an outermost portion of said one opposite end of said cross bar; and wherein said second interengaging support structure comprises a tubular neck portion extending from said one support; and wherein said outermost portion of said one opposite end of said cross bar telescopically engages said tubular neck portion.

28. The article carrier of claim 27, wherein said biasing element comprises a foam-like member inserted into said tubular neck portion.

29. The article carrier of claim 27, wherein said biasing element comprises a foam-like member having a shape substantially in accordance with an interior area of said tubular neck portion to substantially fill said interior area regardless of the degree of telescopic engagement of said first and second interengaging support structures.

30. A vehicle article carrier for supporting articles above an outer body surface of a vehicle, said vehicle article carrier comprising:

a pair of rails adapted to be fixedly supported on said outer body surface;

each one of said rails having a support operable to move slidably therealong;

a cross bar secured having a pair of opposite ends and adapted to extend transversely between said supports;

each said opposite end of said cross bar having a first interengaging support structure;

each one of said supports having a second interengaging support structure;

each said first interengaging support structure being operable to telescopically interengage with an associated one of said second interengaging support structures such that said opposite ends of said cross bar are supported by said pair of supports to thereby dispose said cross bar above said outer body surface of said vehicle;

a biasing element interposed between at least one interengaged pair of said first and second interengaging support structures for exerting a biasing force that tends to urge said first and second interengaging support structures of said at least one interengaged pair away from each other; and said biasing element further operating to allow a distance between said first and second interengaging support structures of said one interengaged pair of support structures to vary as said cross bar is moved along said rails when said rails are not disposed perfectly parallel to each other, to thereby enable placement of said rails in slightly non-parallel positions on said outer body surface without impeding adjustable sliding movement of said cross bar along said rails.

31. The article carrier of claim 30, wherein:

each said first interengaging structure comprises an endmost portion of one of said opposite ends of said cross bar; and wherein each said second interengaging structure comprises a tubular neck portion extending from an associated one of said supports and adapted to telescopically receive an associated one of said first interengaging structures; and wherein said biasing element is disposed within said tubular neck portion.

32. The article carrier of claim 30, wherein said biasing element comprises a foam-like member.

* * * * *